Sept. 28, 1943.    M. E. ZIMMERMANN    2,330,536
MEANS FOR LOCKING VEHICLES AGAINST SELF-PROPULSION
Filed June 16, 1941    2 Sheets-Sheet 1
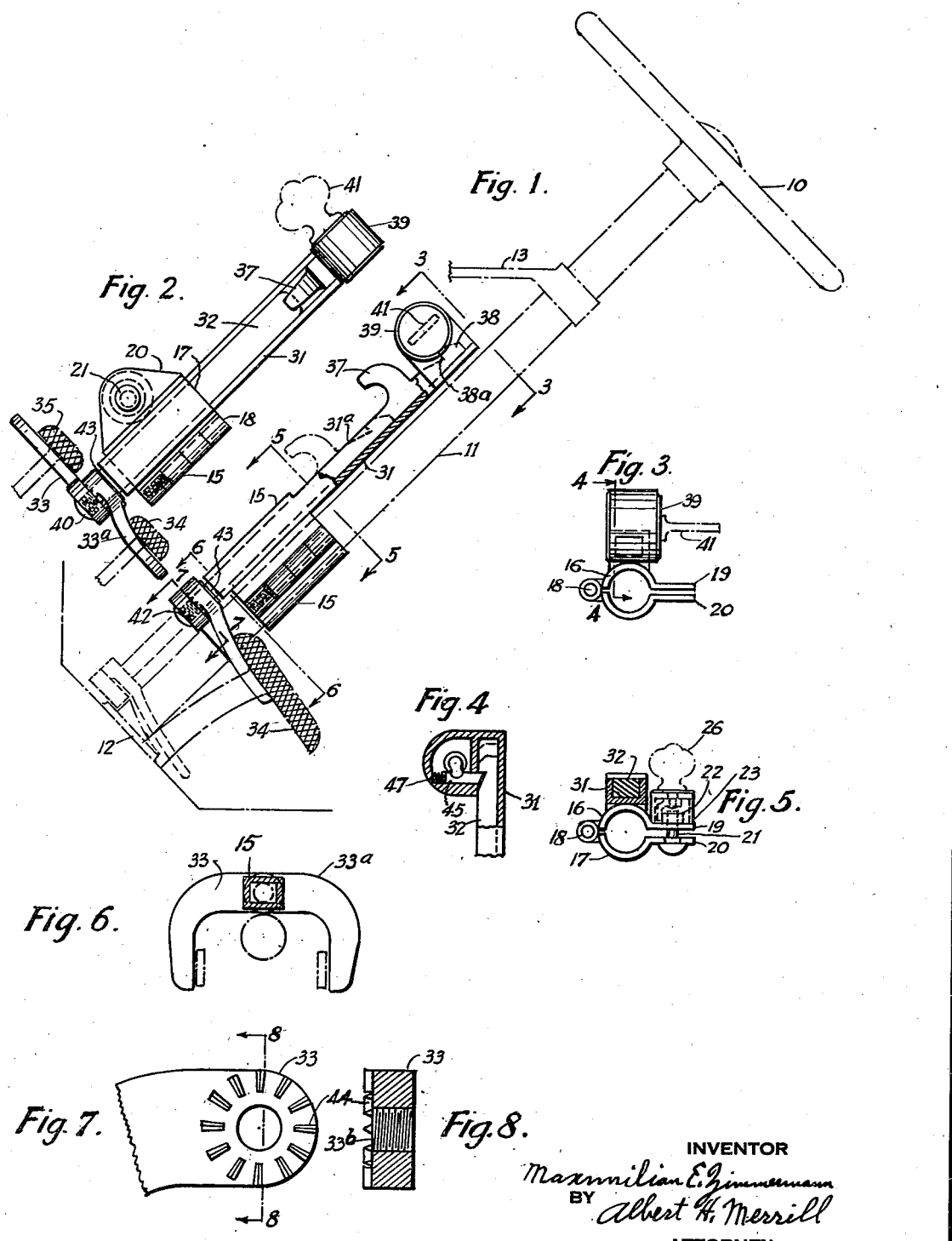
INVENTOR
Maxmilian E. Zimmermann
BY Albert H. Merrill
ATTORNEY

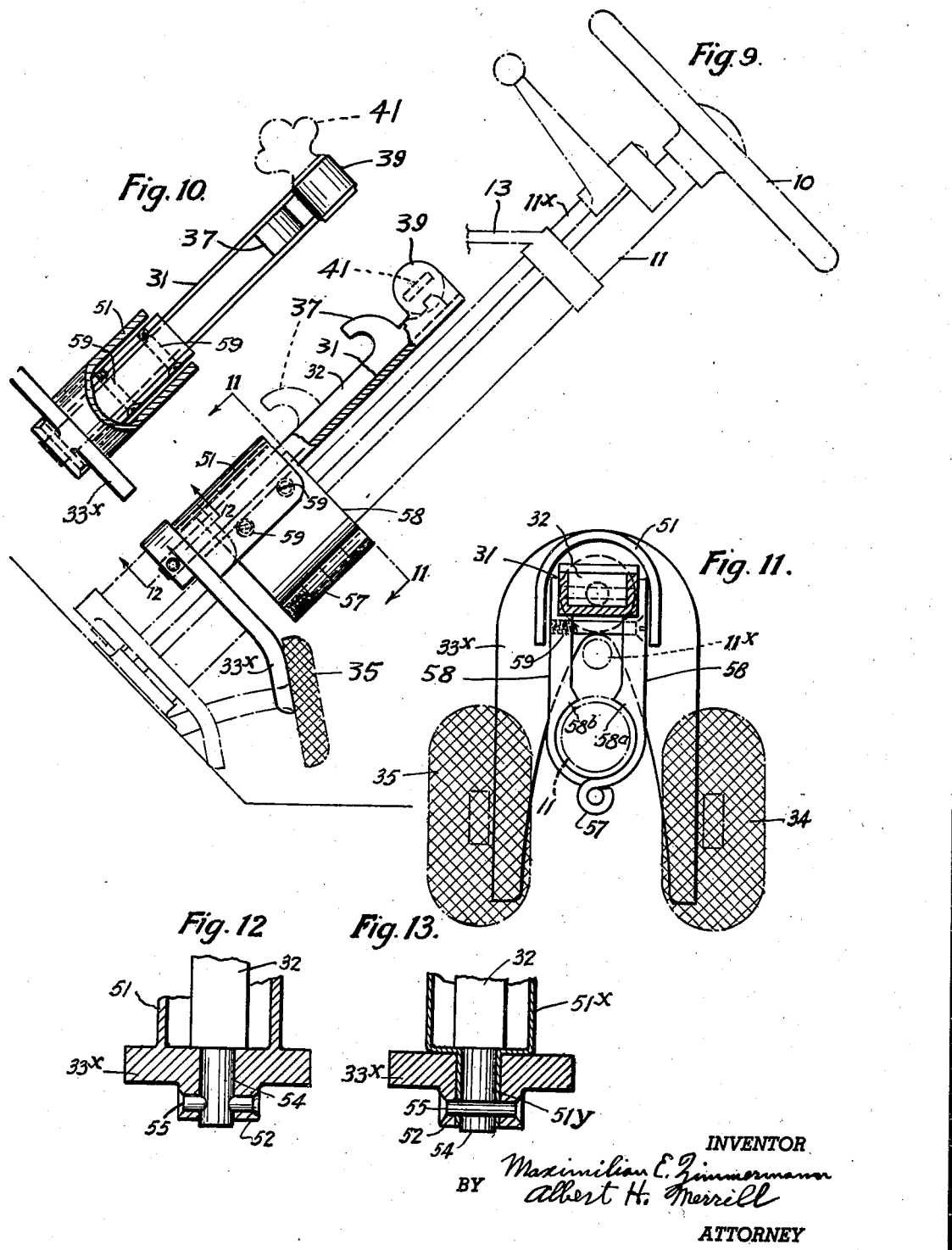

Patented Sept. 28, 1943

2,330,536

UNITED STATES PATENT OFFICE 2,330,536

MEANS FOR LOCKING VEHICLES AGAINST SELF-PROPULSION

Maximilian E. Zimmermann, Los Angeles, Calif.

Application June 16, 1941, Serial No. 398,282

10 Claims. (Cl. 70—199)

This invention pertains to a device for locking vehicles against self-propulsion.

In many States ordinances have been enacted which prohibit locking an automobile against being moved by force externally applied thereto. By this invention the vehicle is not locked in such a manner as to disregard such ordinances, but is, nevertheless, locked in such a way that unauthorized persons cannot utilize its own propulsive power to drive it away.

Among the objects of the invention are:

To provide an improved manually operable key-controlled locking means movable to and from a position wherein it obstructs either the clutch pedal or brake pedal or, if desired, both of said pedals; to provide a device of this character applicable to a number of different makes of automobiles and without altering their construction; and, to provide a locking device of the foregoing kind which can be installed conveniently and without unnecessary expense upon many different types of cars now on the market.

There have been heretofore constructed locking devices for automobiles wherein pedal obstructing means are carried by a slidable bar extending along the steering post column at the side thereof which is nearest to the operator, thus obstructing more or less the space which is between the steering column and the front seat of the vehicle. By this invention this objectionable feature is avoided because the means for operating the pedal obstructing arms is located at that side of the steering column which is farthest from the operator.

The invention includes the combination of the locking means set forth with those manually operable parts of the car which it controls, and also includes a new article of manufacture capable of being separately made and sold for subsequent installing upon the vehicles which it is desired to equip therewith.

In its broader aspect the invention includes lock-controlled means for at will rendering inoperative either manually operable or foot-operable means necessary for the driver to use in driving his car, and is not limited to use in the specific situation in which it is illustrated in the drawings.

Referring to the accompanying drawings, which illustrate desirable embodiments of the invention, Fig. 1 is a side elevation of the device, showing the same applied to an automobile parts of which are indicated by broken lines. Except as to concealed parts the device is shown in its locked position in full lines and in its unlocked position in broken lines. A part of the device is broken away to show underlying structure more clearly.

Fig. 2 is a front elevation of the device, the automobile parts (except the pedals) being omitted.

Fig. 3 is a transverse section taken on the plane indicated by the line 3—3 on Fig. 1, all automobile parts being omitted from the view. Also a portion of the locking means is not shown.

Fig. 4 is a section taken on line 4—4 of Fig. 3.

Fig. 5 is a transverse section, the plane of which is indicated by line 5—5 on Fig. 1. The part of the locking means omitted from Fig. 3 is shown in this view.

Fig. 6 is a transverse section on the plane indicated by the line 6—6 of Fig. 1.

Fig. 7 is a transverse section on an enlarged scale, of a part of one of the pedal arresters, on the plane indicated by line 7—7 on Fig. 1.

Fig. 8 is a section the plane of which is indicated by the line 8—8 on Fig. 7.

Figs. 9 to 13 show modifications of the structures of Figs. 1 to 8, one of these modifications pertaining to forming the pedal arresters in a single piece.

Fig. 9 is a side elevation looking from left to right (from the viewpoint of the driver), a part of the structure being broken away in the left portion of the view, and some conventional parts being shown by broken lines.

Fig. 10 illustrates the device as viewed from in front, a part being broken away to show underlying structure.

Fig. 11 is a cross section on line 11—11 of Fig. 9, the scale of which is larger than in the latter view.

Fig. 12 is a sectional detail taken on line 12—12 of Fig. 9.

Fig. 13 is a reproduction of Fig. 12 except that one of the parts is shown in two pieces instead of in the unitary form shown in Fig. 12.

Referring in detail to Figs. 1 to 8 of the drawings, the device is shown installed upon an automobile having a conventional steering wheel 10 that surmounts a steering column 11 having a basal attachment 12 and at about its midheight a stabilizing bracket 13 through which it passes, said bracket being carried by the cowl (not shown).

In order to attach the device to which the invention pertains to the steering column 11, a bracket 15 is clamped to said column, said bracket including the arcuate clamping jaws 16 and 17 hinged together at 18 and respectively furnished with opposed triangular extensions or arms 19 and 20 through which passes the screwthreaded clamping bolt 21 to which is applied the nut 22. In order to prevent unauthorized unscrewing of said nut a combination lock and housing (which may be of a conventional character) 23, is provided therefor controlled by a key 26.

The stationary jaw 16 of the bracket 15 has an extension 31 which is angularly tubular, preferably square, in cross section, and extends upwardly in channel form. Said extension provides a guide and support within which is slidably fitted a bar 32 having at its upper end the locking head 38 and carrying at its lower end radially extending locking arms 33 and 33a whereby the pedals 34 and 35 are at will locked against depression. With said locking head 38 cooperates a locking means 39 carried by the upper part of the aforesaid extension 31 and consisting of lock-bolt 45 held engaged by spring 47 and retracted against the opposition of said spring by a key 41 as indicated in Fig. 4. The locking of pedals 34 and 35 is thus quickly and easily effected by slightly raising the arresters 33 and 33a into locking position by the finger-hold 37, and releasing of the pedals is effected simply by a slight turn of the key 41. This portion of the device is constructed along conventional lines, modified for the particular purpose and to fit into the general scheme and outline of the device. Care is taken to prevent tampering with the device by eliminating screwed or bolted joints or parts through welded or cast construction.

The aforesaid slidable bar 32 is furnished near its upper end with a forwardly projecting extension 37, shown as an arcuate lug or short arm having its concave side directed downwardly, thus affording a convenient finger-hold for manually sliding the bar upwardly to bring a locking tooth or shoulder 38a carried by its upper extremity into a locked engagement with aforesaid locking means 39.

In Figs. 1, 2, 7 and 8 the locking arms 33a and 33 are shown contoured, by reason of interlocking projections 44, to interengage each in an adjustable, nonswinging relation to each other. Integral with the lower end of the slidable rod 32 is a screwthreaded extension 42 which is reduced in diameter thus providing an annular shoulder 43 thereabove against which abuts the apertured end portion of the upper arm 33a. The lower arm 33, however, has at its inner end a screwthreaded aperture 33b for screwing onto the screwthreaded part 42. The lower arm is threaded, as stated, and the upper arm is free from threads, so that the arms may be adjusted to different angular relations to each other and then attached as shown in Figs. 1 and 2. After these arms have been adjusted and attached, the lower end of part 42 may be peened over as shown at 40 to prevent tampering with the arms.

In Fig. 3 the locking portion of the device and the clamp are shown. The locking portion is illustrated in Fig. 4 and the clamp in Fig. 5.

The modifications shown in Figs. 9 to 13 differ only in a few details from the form of the invention already described, one of which is in regard to an arcuate shield plate 51 which is in a fixed relation to the slidable bar 32, either by the means shown in Fig. 12 or by the construction shown in Fig. 13, and prevents the clamping bolts 59 from being tampered with when said bar 32 is in its upper, pedal locking position. In Fig. 12 said shield is shown made integral with a one piece approximately U-shaped pedal locking member 33x having through its central basal projection 52 a vertical bore to receive a diametrically reduced unthreaded part 54 of the slidable rod 32. This structure is assembled and made secure by means of a riveted pin 55, the end of which may be peened over.

The structure shown in Fig. 13 differs from that of Fig. 12 only in that the shield 51x is made in a separate piece and has a diametrically reduced tubular foot or hub portion 51y fitted within a bore which corresponds to the bore occupied by part 54 in Fig. 12, the securing pin passing through this hub portion.

In Figs. 9 and 11 two columns are provided for, the steering column 11 and the smaller, gear shifting column 11x found on some cars; and a modified clamp is used which includes jaws 58 united by a hinge 57. In using this modified clamp the two screw type bolts 59 are used without nuts, and these bolts are protected by the side of the shield 51 when the device is adjusted to the pedal locking position. Adjacent to the hinge 57 each jaw 58 is arcuated to fit the steering post and is of a resilient, relatively thin character to augment the grip upon the post 11 when the clamping bolts are screwed down, but at 58a and 58b the jaws are furnished with internal shoulders to lengthen their clamping surfaces.

In all the forms of the invention which have been described, whenever the locking bar 32 is released by turning the key 41, said bar automatically gravitates to its lowermost position wherein the parts of the device which underlie the pedals occupy so little vertical space and lie so close to the floor of the vehicle that they do not interfere with the pedals being depressed as far as is ever required for the proper operation of the vehicle.

I claim:

1. In a pedal locking device attachable to the steering wheel column of an automobile, a bracket including clamping means whereby said bracket is applicable to said steering wheel column in a fixed manner, an elongated guide member carried by said bracket, a bar slidably mounted on said guide member to be manually moved upwardly, a pair of pedal arresting arms carried by the lower portion of said bar to underlie both of the aforesaid pedals of the vehicle, said bar having a screw threaded portion at its lower end, said arms each having an apertured end portion through which said screw-threaded portion of the bar extends, the lowermost of said arms having its aperture screw threaded to screw on to said screw threaded portion of said bar, said arms having interlocking portions to maintain them in their angularly adjusted relation to the bar when applied thereto, and means for releasably locking said bar when the device is in applied position, in an elevated position wherein said arms obstruct depression of said pedals.

2. A locking device for attachment to the steering column of an automobile for controlling the operation of the pedals of the automobile, comprising a bracket secured to said steering column, the securing means for said bracket including a clamp furnished with a clamping screw, a bar extending downwardly from said bracket and slidably fastened thereto, said bar having a foot portion which when the bar is operated moves to and from a position wherein it obstructs depression of said pedal, key-controlled means for locking said bar in the position wherein its said foot portion obstructs depression of said pedal, and a partly tubular shield in a fixed relation to the rod and extending upwardly from its lower part in a spaced relation thereto to prevent access to said clamping screw when the rod is in the pedal locking position.

3. The subject matter of claim 2 and, said foot portion of said bar being made in a separate piece from the remainder thereof and being provided with a bore into which a diametrically reduced lower end portion of the bar projects, and fastening means whereby said reduced bar portion is secured to said foot portion.

4. The subject matter of claim 2 and, the foot portion of said bar being made in a separate piece from the remainder thereof and being provided with a bore into which a diametrically reduced lower end portion of the bar projects, said shield having a tubular lower end portion which surrounds the portion of said bar which occupies said bore, and fastening means whereby said foot portion of the bar and shield and reduced bar portion are secured to each other.

5. A device for attachment to the steering wheel column of an automobile to lock a pedal thereof, comprising a bracket secured to said steering wheel column in a fixed manner, an elongated guide member carried by said bracket, a bar slidably mounted on said guide member to be manually moved upwardly, pedal arresting means carried by the lower part of said bar, and means to releasably lock said bar in its elevated position with the pedal arresting means carried thereby in a position to prevent depression of said pedal, said clamping means including a clamping screw and said bar carrying a shield which, when the bar is in its elevated position prevents access to said screw.

6. A device for attachment to the steering wheel column of an automobile to lock a pedal thereof, comprising a bracket including clamping means whereby said bracket is secured to said steering wheel column in a fixed manner, the securing means for said bracket including a clamping screw, pedal arresting means including a part movably mounted on said bracket to move to and from a pedal arresting position, and means to lock said pedal arresting means in relation to said bracket in the pedal arresting position, said pedal arresting means carrying a shield which prevents access to said screw when said pedal arresting means is in the pedal arresting position.

7. In a pedal locking device attachable to the steering wheel column of an automobile, a bracket including clamping means whereby said bracket is securable to said steering wheel column, an elongated guide member carried by said bracket, a bar slidably mounted on said guide member to be manually moved upwardly, a pair of pedal arresting arms carried by the lower portion of said bar to underlie both of the aforesaid pedals of the vehicle, means to releasably lock said bar when the device is in applied position, in relation to said bracket in its elevated position with its pedal arresting arms positioned to prevent depression of said pedals, key operable means to release said bar locking means, said pedal arresting arms being swingably connected to said bar for radial adjustment in different angular relations to each other in a plane extending at substantially a right angle to said bar, and means whereby said arms are clamped to each other and to the bar in their radially adjusted positions.

8. In a pedal locking device for an automobile, a clamp comprising a pair of wings hinged together, said wings having each a concave face directed toward the other to grip between them the steering column of an automobile when the device is in its applied position, means carried by said wings to draw them toward each other into a clamping relation to said column, an elongated guide carried by said clamp, said guide when the device is in its applied position, extending parallel with and adjacent to that side of the aforesaid column which is nearest to the front end of the vehicle, a bar manually slidable along said guide, and a pair of pedal arresting arms carried by the lower end portion of said bar, said arms passing astride said column when the device is in its mounted position and having pedal arresting portions located at that side of said column which is opposite to said guide.

9. In a pedal locking device for an automobile, a bracket, means extending from one side of said bracket to clamp it to the steering column of the automobile, said bracket when in applied position having extending upwardly through it a guide channel which is angular in cross section, said bracket having an upward extension containing a channel which alines with the channel of the bracket and forms an upward continuation thereof, the part of said guide channel which occupies said extension being channel-iron shaped with its open side directed away from the steering column when the device is in its applied position, a bar fitted in a slidable non-turnable relation to said guide channel, a pair of pedal arresting arms secured to said bar below said bracket, said arms when the device is in its mounted position passing astride the steering column and being positioned at all times at the side of the steering column opposite to said bar to underlie the pedals of the automobile, and means carried by the aforesaid upward extension of said bracket to lock said bar in an elevated position in relation thereto, the upper part of said bar having a finger-hold extension which projects from the open side of the channel-iron shaped part of said guide.

10. A locking device for attachment to the steering column of an automobile for controlling the operation of the pedals of the automobile, comprising a bracket securable to said steering column, the securing means for said bracket including a clamp furnished with a clamping screw, a bar extending downwardly from said bracket and slidably fastened thereto, said bar having a foot portion which when the bar is operated moves to and from a position wherein it obstructs depression of a pedal, key-controlled means for locking said bar in the position wherein its said foot portion obstructs depression of said pedal, and means carried by said rod to move upwardly to a position preventing access to said clamping screw when said rod is in the pedal locking position.

MAXIMILIAN E. ZIMMERMANN.